US009490714B1

United States Patent
Nishijima (10) Patent No.: US 9,490,714 B1
(45) Date of Patent: Nov. 8, 2016

(54) SWITCHING POWER SUPPLY
(71) Applicant: Fuji Electric Co., Ltd., Kanagawa (JP)
(72) Inventor: Kenichi Nishijima, Nagano (JP)
(73) Assignee: FUJI ELECTRIC CO., LTD., Kanagawa (JP)
( * ) Notice: Subject to any disclaimer, the term of this patent is extended or adjusted under 35 U.S.C. 154(b) by 0 days.
(21) Appl. No.: 15/063,064
(22) Filed: Mar. 7, 2016

(30) Foreign Application Priority Data

Apr. 15, 2015 (JP) ................... 2015-082930

(51) Int. Cl.
  *H02M 3/335* (2006.01)
(52) U.S. Cl.
  CPC ............................ *H02M 3/33507* (2013.01)
(58) Field of Classification Search
  CPC ......... H02M 3/33523; H02M 3/3353; H02M 3/33507; H02M 2001/0035
  See application file for complete search history.

(56) References Cited

U.S. PATENT DOCUMENTS

| 5,181,170 | A | * | 1/1993 | Huang | H02M 3/33569 363/14 |
| 5,856,916 | A | * | 1/1999 | Bonnet | H02M 3/335 363/20 |
| 7,548,028 | B2 | * | 6/2009 | Ushijima | H02M 7/53838 315/128 |
| 8,953,342 | B2 | * | 2/2015 | Fang | H02M 3/33507 363/147 |
| 2003/0169606 | A1 | * | 9/2003 | Miermans | H02M 1/36 363/49 |
| 2009/0134859 | A1 | * | 5/2009 | Shiroyama | H02M 3/33507 323/282 |
| 2009/0268489 | A1 | * | 10/2009 | Lin | H02M 1/34 363/50 |
| 2010/0033104 | A1 | * | 2/2010 | Rudolph | H05B 41/2825 315/276 |
| 2011/0194314 | A1 | * | 8/2011 | Morota | H02M 3/33507 363/21.15 |
| 2013/0342938 | A1 | * | 12/2013 | Eom | H02M 1/32 361/18 |
| 2013/0343101 | A1 | * | 12/2013 | Zhang | H02M 3/33523 363/21.18 |
| 2015/0078040 | A1 | * | 3/2015 | Nishijima | H02M 3/33523 363/21.15 |
| 2016/0156271 | A1 | * | 6/2016 | Nishijima | H02M 3/33523 363/21.12 |

FOREIGN PATENT DOCUMENTS

JP    2000-116122 A    4/2000

OTHER PUBLICATIONS

"AN10868 GreenChip TEA1733 series fixed frequency flyback controller, Application note", p. 5, Figure 1, [online], Rev. Aug. 2-19, 2010, [found Mar. 13, 2015], internet <URL: http://www.nxp.com/documents/application_note/Data_sheet_AN10868_JA.pdf>. "AN-6093 Design Guideline for Flyback Charger Using FAN104WMX", Figure 1, [online], Rev. 1.0.1—Jul. 12, 2012, [found Mar. 13, 2015], internet <URL: https://www.fairchildsemi.com/application-notes/AN/AN-6093.pdf>.

* cited by examiner

*Primary Examiner* — Timothy J Dole
*Assistant Examiner* — Yusef Ahmed
(74) *Attorney, Agent, or Firm* — Chen Yoshimura LLP (57) ABSTRACT

A bypass switch is connected in parallel to an inductor of a power supply circuit for a control circuit connected to an auxiliary coil, and an output voltage detection circuit connected to the auxiliary coil detects a load state of the secondary side of a transformer. In a control circuit, an error amplifier and a capacitor generate a voltage (an error signal) corresponding to the load state from the difference between a voltage sampled from a signal detected by the output voltage detection circuit by a sample and hold circuit and a reference voltage. A comparator switches the switch OFF when the load is heavy and switches the switch ON when the load is light. This makes it possible to ignore the effect of the inductor when the load is light, and therefore only the heavy load state needs to be considered to keep the output voltage of the secondary side adjusted appropriately.

8 Claims, 8 Drawing Sheets

Example of Adjustment by Inductor on VCC Line    OVP: 26V, UVLO: 9V

| Inductance (μH) | VCC at Iout = 0A (V) | VCC at Iout = 3.42A (V) | Pass/Fail |
|---|---|---|---|
| 4.7 | 10.5 | OVP | Fail |
| 5.7 | 10 | 25 | Pass |
| 6.9 | 10 | 24 | Pass |
| 9.4 | UVLO | 23 | Fail |

SWITCHING POWER SUPPLY

BACKGROUND OF THE INVENTION

1. Technical Field

The present invention relates to a flyback switching power supply, and more particularly to a primary-side regulated switching power supply in which the load state of the secondary side of a transformer is detected on the primary side of the transformer in order to control the output voltage.

2. Background Art

Flyback switching power supplies are typically used in insulated switching power supply applications that require relatively low power ratings on the order of several dozen watts or less. Flyback switching power supplies utilize a transformer with an inverted structure in which the orientations of the primary-side and secondary-side coils or the ways those coils are tapped are inverted. In the transformer, a semiconductor switch is connected in series to the primary-side coil, and power is transmitted from the primary side of the transformer to the secondary side by switching the semiconductor switch. In other words, while the semiconductor switch is ON, current flows through the transformer and energy is stored therein. When the semiconductor switch is switched OFF, the stored energy is output from the secondary-side coil of the transformer across a rectifying diode.

In this type of flyback switching power supply, one well-known method of stabilizing the output voltage from the secondary side is a secondary-side regulated scheme in which fluctuations in the output voltage from the secondary side are detected and fed back to a control circuit on the primary side (see Non-Patent Document 1, for example).

In the secondary-side regulated scheme, fluctuations in the output voltage from the secondary side are typically detected using a shunt regulator, and the detected signals are typically fed back to the control circuit on the primary side using a photocoupler. The control circuit controls the switching of the semiconductor switch according to the detected signals fed back from the secondary side in order to stabilize the output voltage.

During normal operation (which excludes the period of time during which the switching power supply starts up), the auxiliary coil of the transformer supplies power to the control circuit on the primary side. Energy stored in the transformer while the semiconductor switch is ON is transmitted to the auxiliary coil from a terminal with the same polarity as the secondary-side coil when the semiconductor switch is switched OFF, thereby generating a voltage in the auxiliary coil. This voltage is rectified using a diode and smoothed using a capacitor to produce a DC voltage that is used as the supply voltage for the control circuit. More particularly, in the circuit described in Non-Patent Document 1, an inductor is arranged between the diode and the capacitor in order to supply a stable, low-noise supply voltage to the control circuit.

In this secondary-side regulated scheme, the output voltage from the secondary side is detected directly and fed back to the control circuit on the primary side, thereby making it possible to responsively stabilize and control the output voltage of the secondary side.

Meanwhile, another well-known method of stabilizing the output voltage from the secondary side in a switching power supply is a primary-side regulated scheme in which fluctuations in the output voltage from the secondary side are detected on the primary side in order to control the output voltage (see Non-Patent Document 2, for example).

In this primary-side regulated scheme, fluctuations in the output voltage from the secondary side are detected indirectly using the auxiliary coil used to produce a supply voltage for the control circuit, and the control circuit controls the switching of the semiconductor switch according to the detected signals in order to stabilize the output voltage.

In the primary-side regulated circuit disclosed in Non-Patent Document 2, the voltage induced in the auxiliary coil is rectified and smoothed using a diode and a capacitor in order to produce a supply voltage for the control circuit, and the pre-rectified voltage is resistively divided in order to produce a detected voltage of the output voltage of the secondary side, which is also sent to the control circuit. In this way, the auxiliary coil is used both for powering the control circuit and for detecting the output voltage of the secondary side. This makes it possible to remove components such as the shunt regulator and the photocoupler in order to reduce the total number of component parts, thereby making it possible to reduce the cost of the switching power supply.

RELATED ART DOCUMENTS

Non-Patent Documents

Non-Patent Document 1: "AN10868 GreenChip TEA1733 series fixed frequency flyback controller, Application note", Page 5, FIG. 1, [online], Rev. 2-19 Aug. 2010, [found Mar. 13, 2015], internet <URL: http://www.nxp.com/documents/application_note/Data_sheet_AN10868_JA.pdf>

Non-Patent Document 2: AN-6093 Design Guideline for Flyback Charger Using FAN104WMX", FIG. 1, [online], Rev. 1.0.1-Jul. 12, 2012, [found Mar. 13, 2015], internet <URL: https://www.fairchildsemi.com/application-notes/AN/AN-6093.pdf>

SUMMARY OF THE INVENTION

However, attempting to apply the primary-side regulated scheme to a secondary-side regulated circuit in which the power supply circuit for the control circuit includes an inductor (as in Non-Patent Document 1) in an effort to reduce costs results in the following problems when using the same auxiliary coil to produce the supply voltage for the control circuit and to detect the output voltage of the secondary side.

The supply voltage for the control circuit must be kept within a prescribed range regardless of any fluctuations in order to guarantee the operation of the control circuit. More specifically, the supply voltage of the control circuit must remain between an overvoltage protection (OVP) threshold voltage and an undervoltage-lockout (UVLO) threshold voltage. However, the control circuit supply voltage produced by the auxiliary coil fluctuates not only according to whether the load state of the load is heavy or light but also according to the inductance of the inductor. In other words, typically the control circuit supply voltage produced by the auxiliary coil increases as the load becomes heavier (because the amount of energy stored in the transformer while the semiconductor switch is ON increases) and decreases as the load becomes lighter (because the amount of energy stored in the transformer while the semiconductor switch is ON decreases). Moreover, the control circuit supply voltage increases as the inductance of the inductor decreases and decreases as the inductance of the inductor increases. As a result, the inductance of the inductor must be adjusted such that the control circuit supply voltage produced by the auxiliary coil does not exceed the OVP threshold voltage or fall below the UVLO threshold voltage regardless of the load state.

In other words, the control circuit supply voltage produced by the auxiliary coil should decrease when no load is present and the inductance of the inductor is high, and the control circuit supply voltage produced by the auxiliary coil should increase when the load is heavy and the inductance of the inductor is low. Therefore, the inductance of the inductor must be determined such that as the control circuit supply voltage produced by the auxiliary coil fluctuates due to the magnitude of the load and the inductance of the inductor, none of the produced control circuit supply voltages exceed the OVP threshold voltage or fall below the UVLO threshold voltage.

Figure 5:
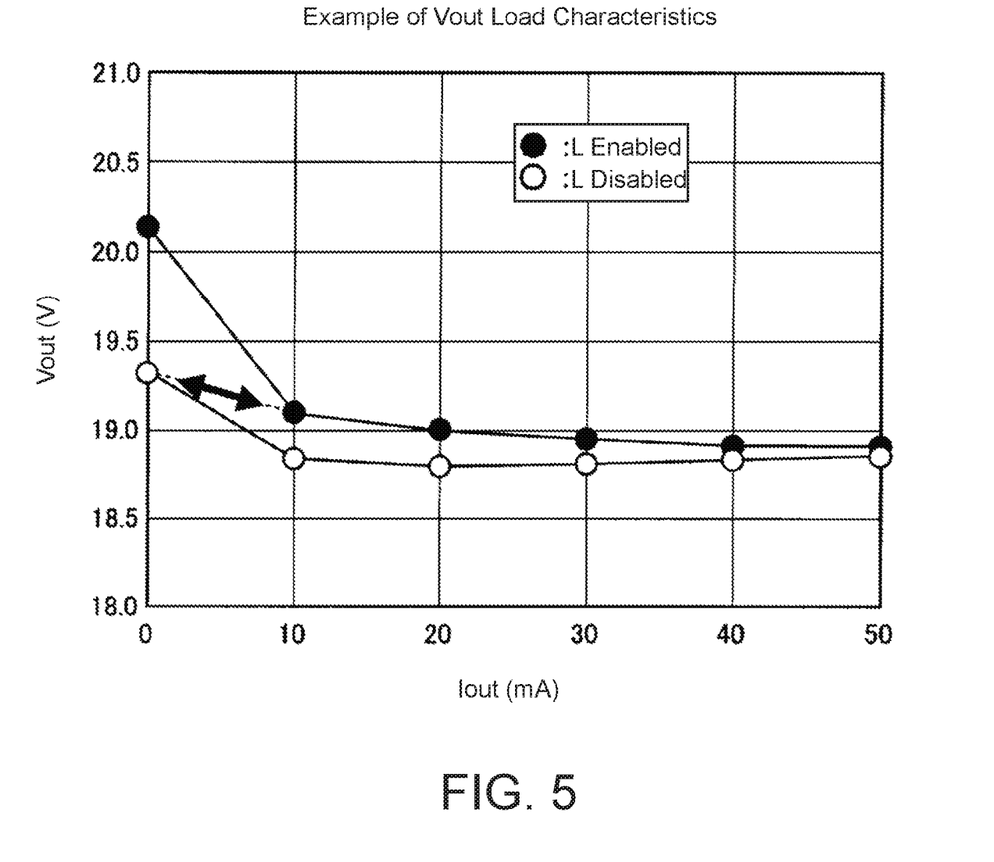
FIG. 5 is a graph showing an example of a Vout loading response when an inductor is present and when the inductor is not present.

Furthermore, as illustrated in FIG. 5 (described later), the output voltage of the secondary side that is controlled according to the (pre-rectified and resistively divided) voltage detected by the auxiliary coil tends to increase near the no-load state.

Therefore, not only does the output voltage of the secondary side tend to exhibit large fluctuations because that output voltage is not detected directly (and thus the regulation is poor), it is also difficult to adjust the circuit constant of the circuit that is connected to the auxiliary coil producing the control circuit supply voltage and includes the inductance of the inductor, and the fluctuations in the output voltage tend to increase in magnitude near the no-load state.

The present invention was made in view of these problems and aims to provide a primary-side regulated switching power supply in which when the power supply circuit that rectifies and smooths the voltage induced in the auxiliary coil includes an inductor, the inductor can be selected easily, and fluctuations in the output voltage near the no-load state can be reduced. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a switching power supply, including: a transformer that includes a primary coil to which a DC voltage is input at one end, a secondary coil, and an auxiliary coil; a semiconductor switch connected in series to the other end of the primary coil to perform a switching operation; an output voltage generation circuit that rectifies and smooths an output of the secondary coil and outputs an output voltage that has been rectified and smoothed; an output voltage detection circuit connected to the auxiliary coil to generate and output an output voltage detection signal corresponding to the output voltage of the output voltage generation circuit; a control circuit that receives the output voltage detection signal and controls switching of the semiconductor switch so as to stabilize the output voltage; a power supply circuit for the control circuit that generates a supply voltage for the control circuit and that includes a rectifying diode, an inductor, and a capacitor, an anode of the rectifying diode being connected to the auxiliary coil, one terminal of the inductor being connected to a cathode of the rectifying diode, and another terminal of the inductor being connected to the capacitor; and a bypass switch connected in parallel to the inductor of the power supply circuit for the control circuit, wherein the control circuit includes a load state determination unit determining a load state according to the output voltage detection signal, the load state determination unit outputting a control signal that turns the bypass switch OFF when the load state determination unit detects a heavy load and turns the bypass switch ON when the load state determination unit detects a light load.

The switching power supply configured as described above makes it possible to easily select an inductor and reduce fluctuations in the output voltage near the no-load state by disabling the inductor when the load is light.

It is to be understood that both the foregoing general description and the following detailed description are exemplary and explanatory, and are intended to provide further explanation of the invention as claimed.

BRIEF DESCRIPTION OF THE DRAWINGS

FIGS. 6A and 6B include graphs showing the effect of disabling an inductor in a no-load state.

DETAILED DESCRIPTION OF EMBODIMENTS

Next, embodiments of the present invention as applied to a primary-side regulated flyback switching power supply will be described in detail with reference to figures. Note that in the following description, the same reference characters are sometimes used both to label the terminals of the circuits in the figures and to indicate the voltages, signals, or the like present in those terminals. Moreover, each of the embodiments may be implemented by combining aspects of one or more of the other embodiments as long as doing so does not represent a technical impossibility.

Figure 1:
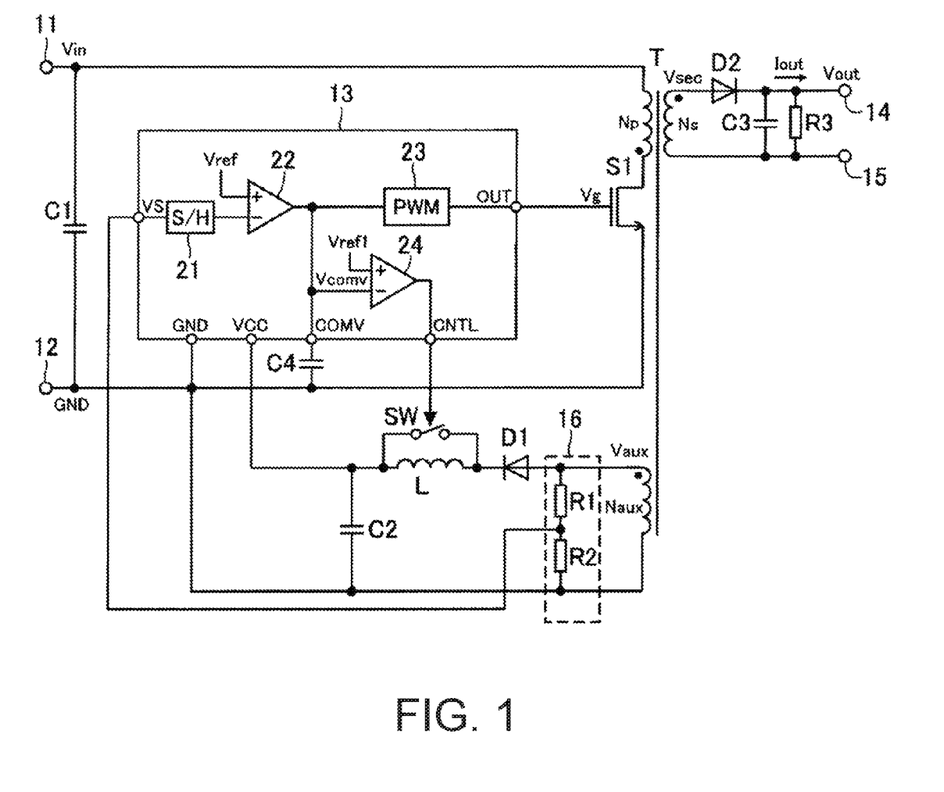
FIG. 1 is a circuit diagram illustrating an example of a configuration of a switching power supply according to Embodiment 1.
Figure 2:
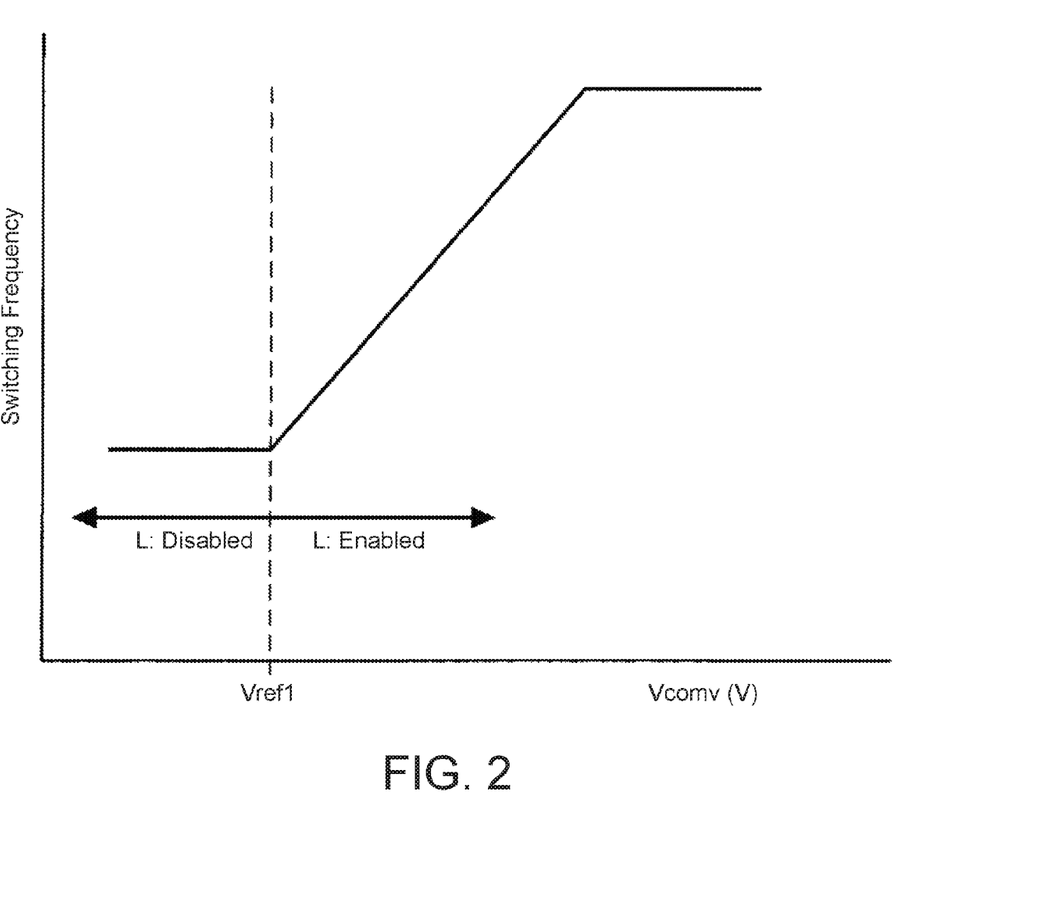
FIG. 2 is a graph showing an example of how switching frequency changes according to the load state.

FIG. 1 is a circuit diagram illustrating an example of a configuration of a switching power supply according to Embodiment 1, and FIG. 2 is a graph showing an example of how switching frequency changes according to the load state.

The switching power supply includes an input terminal 11 to which a DC input voltage Vin is input. The input terminal 11 is connected to one of the terminals of a capacitor C1 and to one of the terminals of a primary coil Np of a transformer T. The other terminal of the capacitor C1 is connected to an input terminal 12, which has an electric potential equal to the electric potential of a ground GND of a primary side. The other terminal of the primary coil Np of the transformer T is connected to the drain terminal of a semiconductor switch S1 (a main switch) constituted by a metal-oxide-semiconductor field-effect transistor (MOSFET). The source terminal of the semiconductor switch S1 is connected to a terminal GND of a control circuit 13 and to the input terminal 12.

The transformer T includes an auxiliary coil Naux, and one of the terminals of the auxiliary coil Naux is connected to the anode of a diode D1. The cathode of the diode D1 is connected to one of the terminals of an inductor L. The other terminal of the inductor L is connected to one of the terminals of a capacitor C2 and to a terminal VCC of the control circuit 13. The other terminal of the capacitor C2 is connected to the other terminal of the auxiliary coil Naux, to the terminal GND of the control circuit 13, and to the input terminal 12. The diode D1, the inductor L, and the capacitor C2 form a rectifying and smoothing circuit that functions as a power supply circuit for the control circuit.

A switch SW (bypass switch) is connected in parallel to the inductor L, and the control terminal of the switch SW is connected to a terminal CNTL of the control circuit 13. In this way, the inductor L is enabled and inserted on the VCC line when the control circuit 13 turns the switch SW OFF (the non-conducting state), and the inductor L is disabled and removed from the VCC line when the control circuit 13 turns the switch SW ON (the conducting state).

Resistors R1 and R2 are connected together in series and are connected in parallel to the auxiliary coil Naux, thereby forming an output voltage detection circuit 16 that indirectly detects changes in an output voltage Vout of a secondary side. The common connection between the resistors R1 and R2 is connected to a terminal VS of the control circuit 13.

The transformer T also includes a secondary coil Ns, and one of the terminals of the secondary coil Ns is connected to the anode of a diode D2. The cathode of the diode D2 is connected to one of the terminals of a capacitor C3 and to an output terminal 14 that outputs the output voltage Vout of the secondary side. The other terminal of the capacitor C3 is connected to the other terminal of the secondary coil Ns and to an output terminal 15. A dummy resistor R3 is connected between the output terminals 14 and 15 in order to suppress increases in the output voltage Vout when the load is light or no load is present. The dummy resistor R3 and the rectifying and smoothing circuit formed by the diode D2 and the capacitor C3 form an output voltage generation circuit.

The primary coil Np, the secondary coil Ns, and the auxiliary coil Naux of the transformer T are magnetically coupled to one another. The secondary coil Ns is wound such that the polarity thereof is opposite to the primary coil Np, and the auxiliary coil Naux is wound such that the polarity thereof is the same as the secondary coil Ns.

The control circuit 13 includes a sample and hold (S/H) circuit 21 connected to the terminal VS, and the output terminal of the sample and hold circuit 21 is connected to the inverting input terminal of an error amplifier 22. A reference voltage Vref is supplied to the non-inverting input terminal of the error amplifier 22, and the output terminal of the error amplifier 22 is connected to a terminal COMV of the control circuit 13, to a pulse width modulation (PWM) circuit 23, and to the inverting input terminal of a comparator 24. The output terminal of the PWM circuit 23 is connected to a terminal OUT of the control circuit 13. A reference voltage Vref1 is supplied to the non-inverting input terminal of the comparator 24, and the output terminal of the comparator 24 is connected to the terminal CNTL of the control circuit 13.

The terminal OUT of the control circuit 13 is connected to the gate terminal of the semiconductor switch S1. The terminal COMV of the control circuit 13 is connected to one of the terminals of a capacitor C4, and the other terminal of the capacitor C4 is connected to the terminal GND of the control circuit 13 and to the input terminal 12. The terminal CNTL of the control circuit 13 is connected to the control terminal of the switch SW.

In the switching power supply configured as described above, when the control circuit 13 switches the semiconductor switch S1 ON, current begins to flow through the primary coil Np of the transformer T, thereby storing magnetic energy in the transformer T. This induces voltages in the auxiliary coil Naux and the secondary coil Ns, but these voltages reverse-bias the diodes D1 and D2 of the auxiliary coil Naux and the secondary coil Ns, and therefore neither the power supply circuit for the control circuit nor the output voltage generation circuit begin to operate. Furthermore, in theory there is a proportional relationship between the voltage Vaux induced in the auxiliary coil Naux and the voltage Vsec induced in the secondary coil Ns, and the voltage Vsec induced in the secondary coil Ns is equal to the output voltage Vout plus the forward voltage of the diode D1. Therefore, the voltage Vaux induced in the auxiliary coil Naux can be used to indirectly detect the output voltage Vout.

Next, when the control circuit 13 switches the semiconductor switch S1 OFF, current stops flowing through the primary coil Np of the transformer T. This induces voltages in the auxiliary coil Naux and the secondary coil Ns that forward-bias the diodes D1 and D2 of the auxiliary coil Naux and the secondary coil Ns. This causes both the power supply circuit for the control circuit and the output voltage generation circuit to start operating and outputting a voltage VCC and an output voltage Vout, respectively.

Furthermore, the voltage Vaux induced in the auxiliary coil Naux is divided by the output voltage detection circuit 16 and input to a terminal VS of the control circuit 13 as the output voltage detection signal. The signal VS input to this terminal VS is then input to the sample and hold circuit 21. The sample and hold circuit 21 samples the signal VS for a prescribed period of time starting from when the semiconductor switch S1 is switched OFF and stores the sampled values. The sampled values of the signal VS are then output to the error amplifier 22 and compared to the reference voltage Vref. The error amplifier 22 is a transconductance amplifier. The output current from the error amplifier 22 is integrated by the capacitor C4, thereby generating a voltage Vcomv (an error signal) that is then input to the PWM circuit 23. This voltage Vcomv increases when the load on the switching power supply is heavy and decreases when the load is light and can therefore be used as an indicator of the load state.

The capacitor C4 may also be integrated into the control circuit 13. In this case, the terminal COMV is no longer required. Moreover, FIG. 1 illustrates an example in which a transconductance amplifier is used for the error amplifier. However, an operational amplifier in which a phase compensation circuit is connected between the output terminal and the inverting input terminal may be used instead of a transconductance amplifier. This removes the need for the need for the capacitor C4 entirely, and therefore in this case as well the terminal COMV for connecting the capacitor C4 is no longer required.

The voltage Vcomv is input to the PWM circuit 23. The PWM circuit 23 generates signals for switching the semiconductor switch S1 according to the state of the load. FIG. 2 shows the relationship between the load state and the switching frequency used. While the voltage Vcomv is less than a first threshold voltage (the reference voltage Vref1), a minimum fixed switching frequency is used, and when the voltage Vcomv becomes greater than a second threshold voltage, a maximum fixed switching frequency is used. Moreover, between the first threshold voltage and the second threshold voltage, the switching frequency increases from the minimum fixed switching frequency to the maximum fixed switching frequency as the voltage Vcomv increases. In other words, the semiconductor switch S1 is switched at a higher switching frequency as the load becomes heavier and is switched at a lower switching frequency as the load becomes lighter.

Furthermore, the voltage Vcomv is compared to the reference voltage Vref1 in the comparator 24, which functions as a load state determination unit. When the voltage Vcomv is greater than the reference voltage Vref1 (that is, when the load is heavy), the comparator 24 outputs a signal CNTL that turns the switch SW OFF, and when the voltage Vcomv is less than the reference voltage Vref1 (that is, when the load is light), the comparator 24 outputs a signal CNTL that turns the switch SW ON.

Next, the behavior of the voltage VCC of the power supply circuit for the control circuit and the output voltage Vout of the output voltage generation circuit when the switch SW is switched OFF and the inductor L is enabled and when the switch SW is switched ON and the inductor L is disabled will be described.

Figure 3:
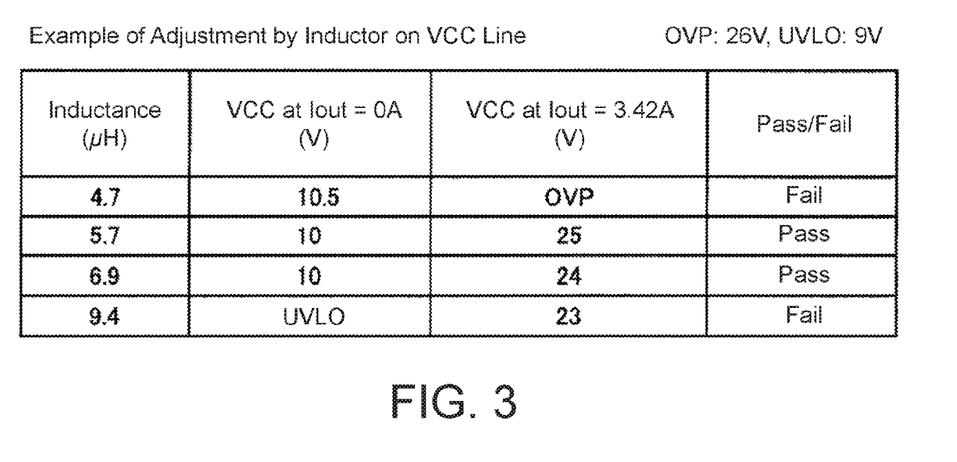
FIG. 3 is a table showing an example of adjusting an inductor on a VCC line.
Figure 4:
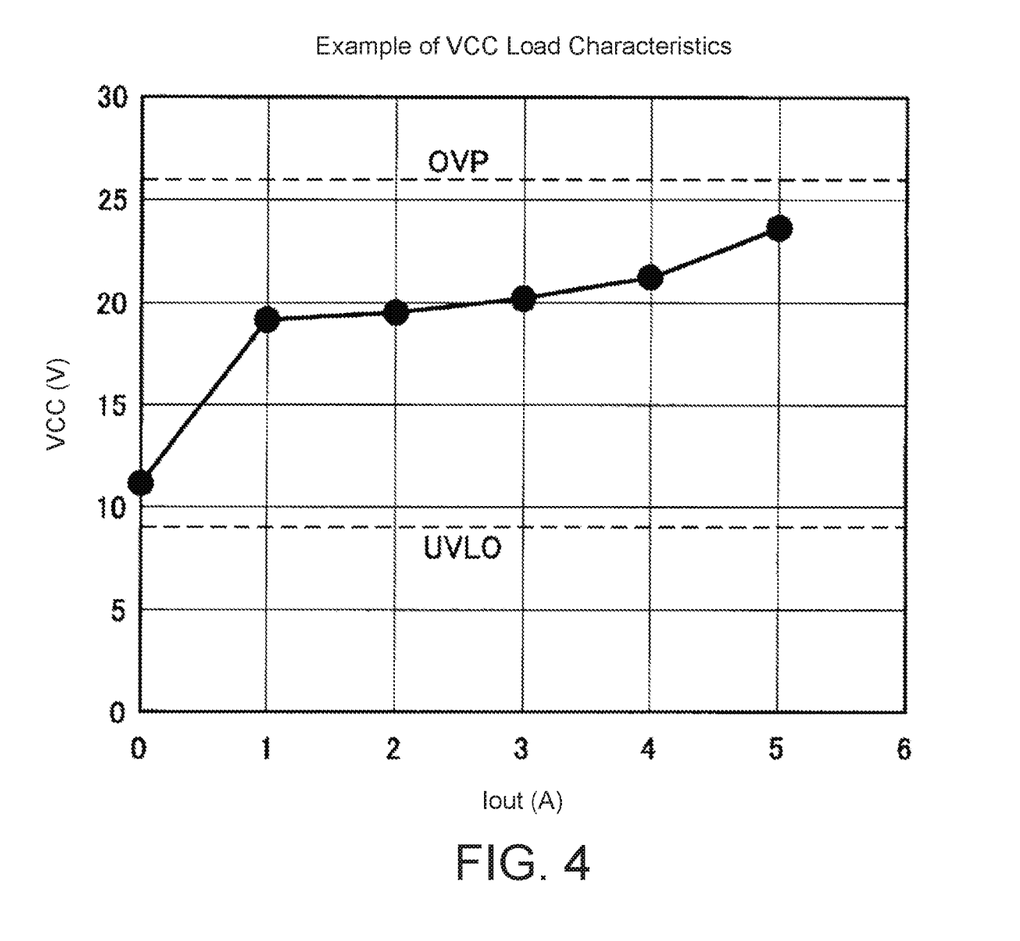
FIG. 4 is a graph showing an example of the loading response of a voltage VCC.

FIG. 3 is a table showing an example of adjusting the inductor on the VCC line, and FIG. 4 is a graph showing an example of the loading response of the voltage VCC.

The control circuit 13 also includes a protection circuit (not illustrated in the figure) that monitors the supply voltage VCC applied to the control circuit 13 and stops the operation of the control circuit 13 when the voltage VCC exceeds the OVP threshold voltage or falls below the UVLO threshold voltage. Therefore, in order to guarantee that the control circuit 13 continues to operate, the voltage VCC generated by the power supply circuit for the control circuit must be adjusted to remain between the OVP threshold voltage and the UVLO threshold voltage regardless of the load state.

FIG. 3 shows the results of examining the changes in the voltage VCC when the inductance of the inductor L is changed. When the load is heavy (that is, when the output current Iout=3.42 A), the voltage VCC tends to increase beyond the OVP threshold voltage the lower the inductance of the inductor L becomes. Moreover, when the load is light (that is, when the output current Iout=0 A), the voltage VCC tends to fall below the UVLO threshold voltage the higher the inductance of the inductor L becomes.

In FIG. 4, the horizontal axis is the output current Iout, which indicates the current load state, and the vertical axis is the voltage VCC. Moreover, here the OVP threshold voltage is 26V and the UVLO threshold voltage is 9V. FIG. 4 shows an example of the changes in the voltage VCC when the inductance is fixed and the load current is changed. However, it is apparent that there is little margin relative to the UVLO threshold voltage in the no-load state (that is, when the output current Iout=0 A) and that there is little margin relative to the OVP threshold voltage when the load is heavy (that is, when the output current Iout=5 A).

Therefore, in the switching power supply according to Embodiment 1, when the load is light the switch SW is used to short-circuit the inductor L and force-set the inductance to zero, thereby preventing the voltage VCC from falling below the UVLO threshold voltage. In other words, this avoids the problem shown in FIG. 4 in which there is little margin relative to the UVLO threshold voltage in the no-load state (that is, when the output current Iout=0 A). This also means that the voltage VCC can be kept adjusted appropriately simply by selecting an inductance that prevents the voltage VCC from exceeding the OVP threshold voltage when the load is heavy.

FIG. 5 is a graph showing an example of the Vout loading response when the inductor is present and when the inductor is not present. In FIG. 5, the horizontal axis is the output current Iout, which indicates the current load state, and the vertical axis is the output voltage Vout of the output voltage generation circuit. In FIG. 5, the region near the no-load state where the output current Iout=0 A is particularly significant. Also, in FIG. 5 the solid circles are for the case in which the inductor L of the power supply circuit for the control circuit is enabled (that is, when the switch SW is OFF), and the hollow circles are for the case in which the inductor L is disabled (that is, when the switch SW is ON).

As shown in FIG. 5, there is a significant difference in the loading response of the output voltage Vout in the no-load state in which Iout=0 according to whether the inductor L is enabled or disabled. In other words, the output voltage Vout tends to increase more rapidly when the inductor L is enabled than when the inductor L is disabled.

However, in the switching power supply according to Embodiment 1, the inductor L is short-circuited and force-disabled when Iout=0, and therefore when Iout=0, the output voltage Vout is set to the value corresponding to a disabled inductor L. This makes it possible to reduce increases in the output voltage Vout of the secondary side when entering the no-load state.

Figure 6A:
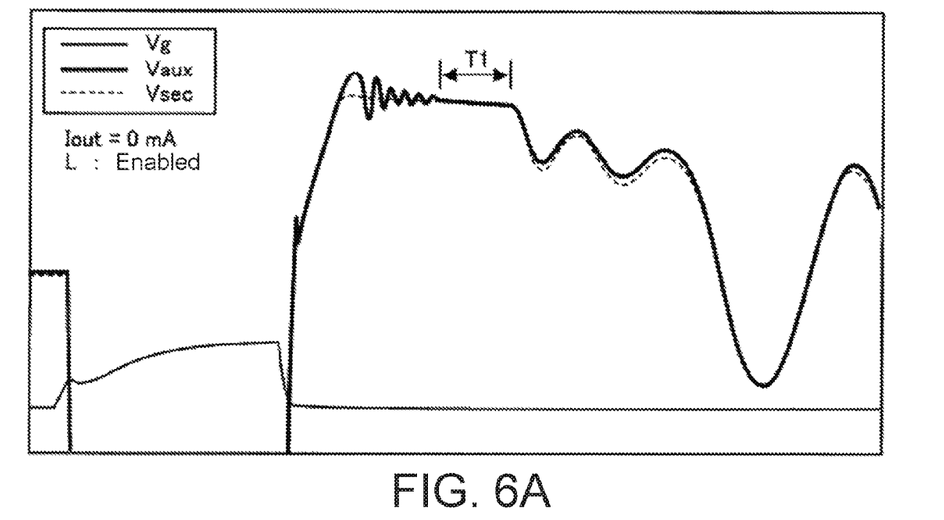
FIG. 6A shows voltage waveforms for an auxiliary coil and a secondary coil when the inductor is enabled.
Figure 6B:
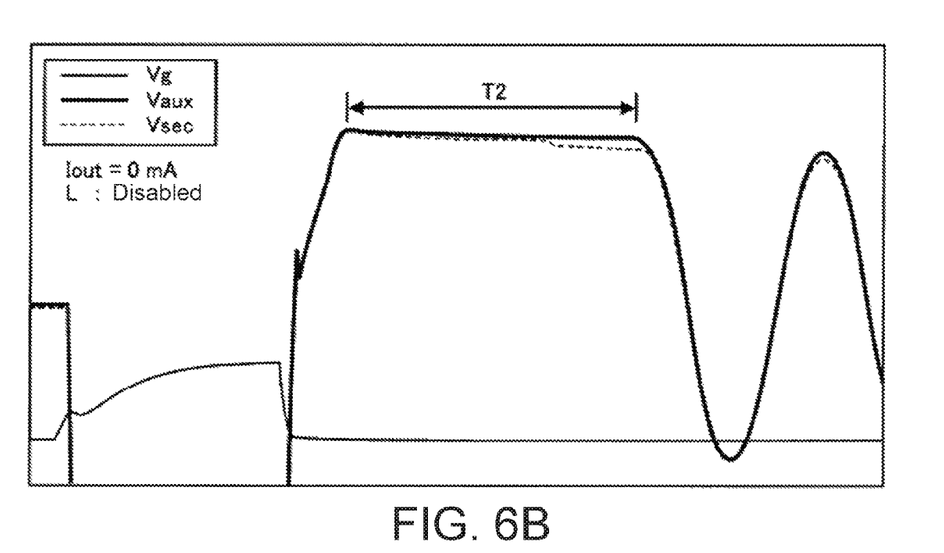
FIG. 6B shows voltage waveforms for the auxiliary coil and the secondary coil when the inductor is disabled.

FIGS. 6A and 6B include graphs showing the effect of disabling the inductor in the no-load state. FIG. 6A shows the voltage waveforms for the auxiliary coil and the secondary coil when the inductor is enabled, and FIG. 6B shows the voltage waveforms for the auxiliary coil and the secondary coil when the inductor is disabled.

Here, once a gate voltage Vg to the semiconductor switch S1 is turned OFF, the voltage Vaux and the voltage Vsec are induced in the auxiliary coil Naux and the secondary coil Ns, respectively. Note also that in the example shown here, the coil turn ratio between the auxiliary coil Naux and the secondary coil Ns is 1:1.

As illustrated in FIG. 6A, when the inductor L is enabled, the voltage Vaux of the auxiliary coil Naux increases and then immediately begins to exhibit small oscillations due to the presence of the inductor L. The voltage Vaux then remains substantially constant for a short period of time before beginning to exhibit a resonance phenomenon in which the voltage fluctuates significantly due to the resonant circuit formed by the inductor L and the capacitor C2. Here, T1 is the period of time during which the voltage remains substantially constant.

In contrast, as illustrated in FIG. 6B, when the inductor L is disabled, the voltage Vaux of the auxiliary coil Naux increases and then immediately begins to remain substantially constant for a long period of time before beginning to exhibit the resonance phenomenon in which the voltage fluctuates significantly due to the resonant circuit formed by the auxiliary coil Naux and the capacitor C2. Here, T2 is the period of time during which the voltage remains substantially constant.

Therefore, disabling the inductor L in the no-load state causes the period of time during which the voltage Vaux of the auxiliary coil Naux remains substantially constant immediately after the initial increase to last longer than when the inductor L is enabled. This makes it possible to expand the allowable range of times during which the sample and hold circuit 21 can sample the voltage VS detected by the output voltage detection circuit 16 from T1 to T2. In other words, if the inductor L is enabled in the no-load state and the sampling timing gets shifted to after the period T1 for some reason even though the sampling period was set to occur within the period T1, the voltage that is decreasing due to resonance may be erroneously sampled as the voltage VS. If this happens, the control circuit 13 determines that the output voltage Vout of the secondary side is decreasing and starts performing control operations to increase the voltage Vout of the secondary side, thereby causing the output voltage Vout to increase even further beyond the value shown in FIG. 5 when the output current Iout=0. In the switching power supply according to Embodiment 1, however, the inductor L is disabled when the output current Iout=0, thereby making it possible to build a margin of error into the period T2 and fit the sampling period within that period T2 even if the timing at which the sampling actually occurs is shifted slightly.

Figure 7:
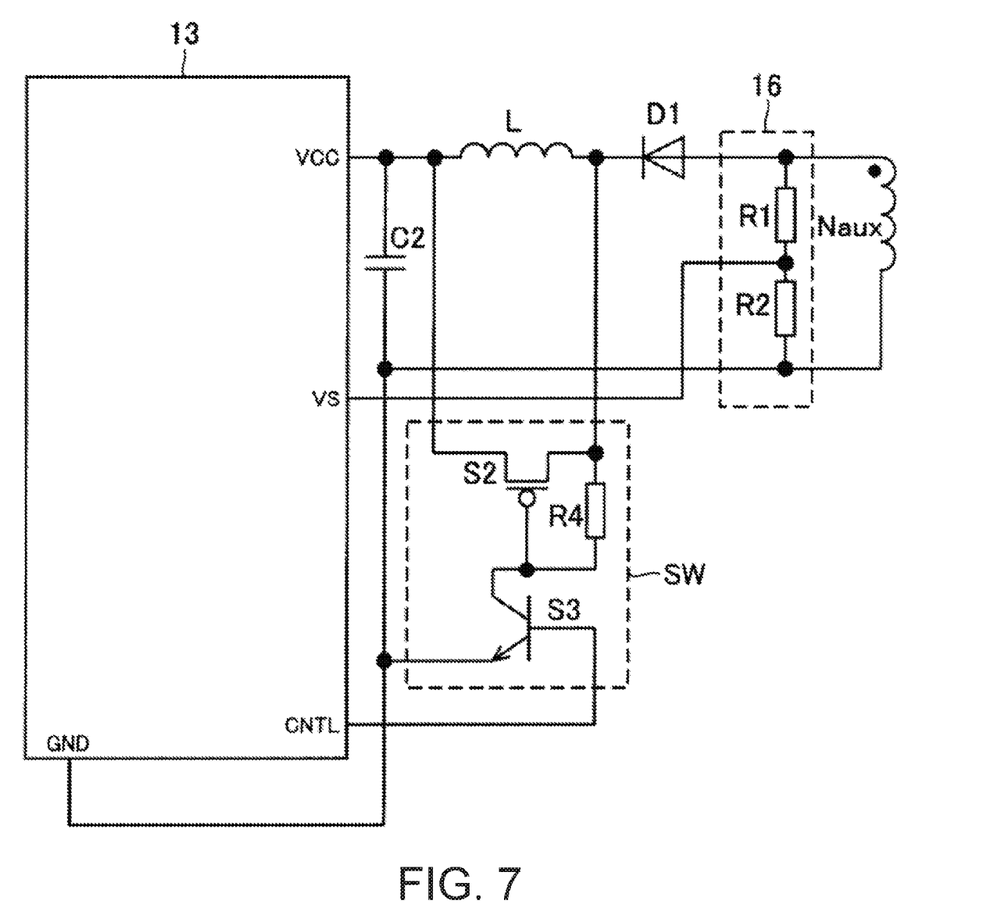
FIG. 7 is a circuit diagram illustrating an example of a configuration of a switching power supply according to Embodiment 2.

FIG. 7 is a circuit diagram illustrating an example of a configuration of a switching power supply according to Embodiment 2. Note that in FIG. 7, the same reference characters are used for components that are the same as or equivalent to components in FIG. 1, and detailed descriptions of those components will be omitted here. Moreover, in FIG. 7 only the characteristic auxiliary coil Naux and the control circuit 13 of the switching power supply according to Embodiment 2 are illustrated.

In the switching power supply according to Embodiment 2, the switch SW that is connected in parallel to the inductor L includes a semiconductor switch S2 constituted by a P-type MOS transistor, a resistor R4, and a semiconductor switch S3 constituted by an NPN-type bipolar transistor. In other words, the node between the cathode of the diode D1 and the inductor L is connected to the source terminal of the semiconductor switch S2 and to one of the terminals of the resistor R4, and the node between the inductor L and the capacitor C2 is connected to the drain terminal of the semiconductor switch S2. The other terminal of the resistor R4 is connected to the gate terminal of the semiconductor switch S2 and to the collector electrode of the semiconductor switch S3. The emitter electrode of the semiconductor switch S3 is connected to the terminal GND, and the base electrode of the semiconductor switch S3 is connected to the terminal CNTL of the control circuit 13.

In Embodiment 2, when the load is heavy the control circuit 13 sends an L-level (low) signal from the terminal CNTL to the switch SW. This switches the semiconductor switch S3 OFF and causes the gate and source terminals of the semiconductor switch S2 to have the same electric potential, thereby switching the semiconductor switch S2 to the OFF state and enabling the inductor L on the VCC line.

Furthermore, when the load is light or no load is present, the control circuit 13 sends an H-level (high) signal from the terminal CNTL to the switch SW. This switches the semiconductor switch S3 ON, and the voltage drop caused by the current that flows through the resistor R4 is applied between the gate and source terminals of the semiconductor switch S2, thereby switching the semiconductor switch S2 to the ON state and disabling the inductor L on the VCC line.

In the switch SW of Embodiment 2, an NPN-type bipolar transistor is used for the semiconductor switch S3 that controls the semiconductor switch S2. However, an N-type MOS transistor or a PNP-type bipolar transistor may also be used for the semiconductor switch S3. When the semiconductor switch S3 is a PNP-type bipolar transistor, the emitter electrode should be connected to the gate terminal of the semiconductor switch S2, the collector electrode should be connected to the terminal GND, and the logic level of the signal from the comparator 24 should be inverted.

Figure 8:
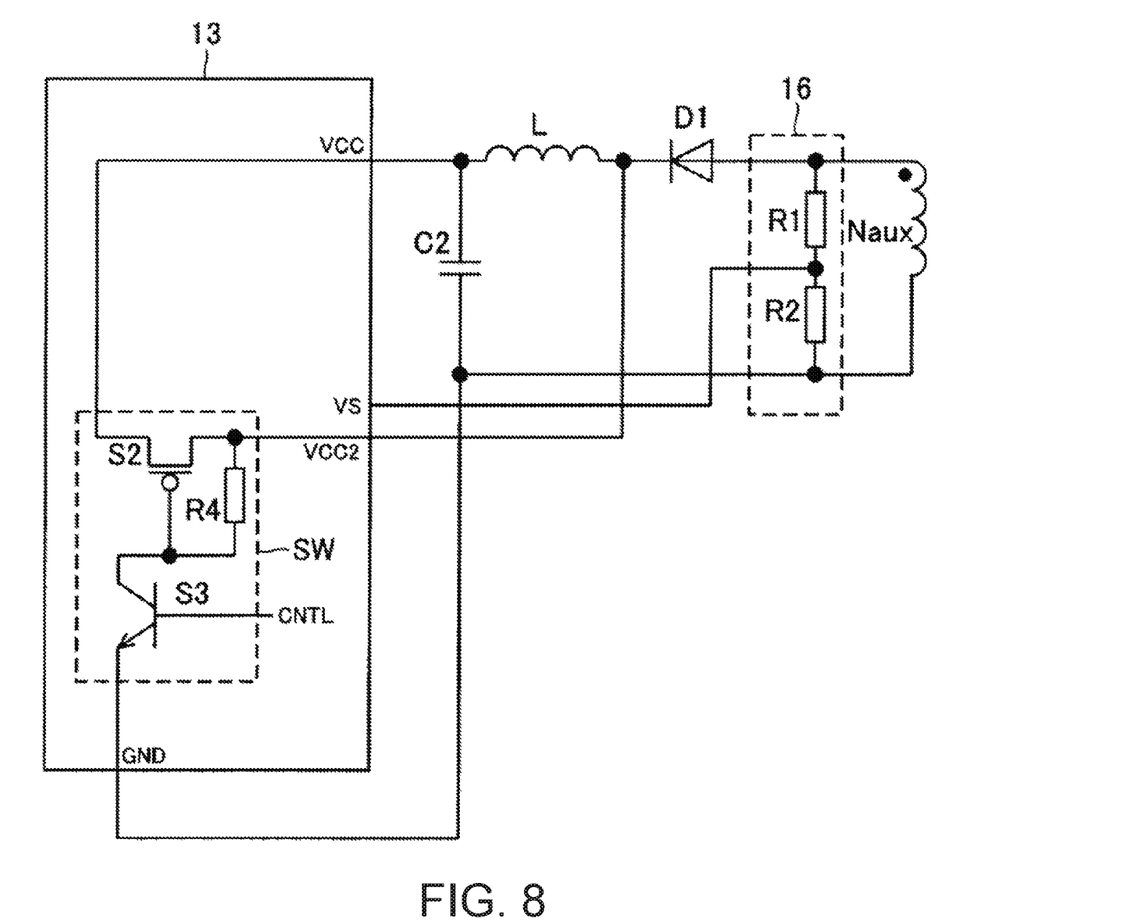
FIG. 8 is a circuit diagram illustrating an example of a configuration of a switching power supply according to Embodiment 3.

FIG. 8 is a circuit diagram illustrating an example of a configuration of a switching power supply according to Embodiment 3. Note that in FIG. 8, the same reference characters are used for components that are the same as or equivalent to components in FIG. 7, and detailed descriptions of those components will be omitted here. Moreover, in FIG. 8 only the characteristic auxiliary coil Naux and the control circuit 13 of the switching power supply according to Embodiment 3 are illustrated.

In the switching power supply according to Embodiment 3, the functionality of the switch SW that is connected in parallel to the inductor L is integrated into the control circuit 13. In this switching power supply, using an integrated circuit for the control circuit 13 removes the need to use separate components to configure the switch SW, thereby making it possible to reduce the production costs of the switching power supply. When an integrated circuit is used for the control circuit 13, the terminal CNTL of the control circuit 13 is removed and replaced with a terminal VCC2.

The switch SW of Embodiment 3 includes a semiconductor switch S2 constituted by a P-type MOS transistor, a resistor R4, and a semiconductor switch S3 constituted by an NPN-type bipolar transistor.

The node between the cathode of the diode D1 and the inductor L is connected to the terminal VCC2 of the control circuit 13. In the control circuit 13, the terminal VCC2 is connected to the source terminal of the semiconductor switch S2 and to one of the terminals of the resistor R4, and the terminal VCC is connected to the drain terminal of the semiconductor switch S2. The other terminal of the resistor R4 is connected to the gate terminal of the semiconductor switch S2 and to the collector electrode of the semiconductor switch S3. The emitter electrode of the semiconductor switch S3 is connected to the terminal GND, and the base electrode of the semiconductor switch S3 is connected to the output terminal of the comparator 24 (see FIG. 1) that outputs a signal CNTL.

When the load is heavy, the comparator 24 sends an L-level signal to the base electrode of the semiconductor switch S3. This switches the semiconductor switch S3 OFF and causes the gate and source terminals of the semiconductor switch S2 to have the same electric potential, thereby switching the semiconductor switch S2 to the OFF state and enabling the inductor L on the VCC line.

When the load is light or no load is present, the comparator 24 sends an H-level signal to the base electrode of the semiconductor switch S3. This switches the semiconductor switch S3 ON and switches the semiconductor switch S2 to the ON state, thereby short-circuiting the terminal VCC and the terminal VCC2 of the control circuit 13 and disabling the inductor L on the VCC line.

The description above assumes that the reference voltage (the reference voltage Vref1 in FIG. 1) input to the non-inverting input terminal of the comparator 24 (see FIG. 1) that outputs the signal CNTL is equal to the voltage Vcomv (the reference voltage Vref1 in FIG. 2) that occurs when the switching frequency is switched from the minimum fixed switching frequency region to the monotonically increasing region. However, these voltages do not necessarily need to be equal and may be different.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A switching power supply, comprising:
   a transformer that includes a primary coil to which a DC voltage is input at one end, a secondary coil, and an auxiliary coil;
   a semiconductor switch connected in series to the other end of the primary coil to perform a switching operation;
   an output voltage generation circuit that rectifies and smooths an output of the secondary coil and outputs an output voltage that has been rectified and smoothed;
   an output voltage detection circuit connected to the auxiliary coil to generate and output an output voltage detection signal corresponding to the output voltage of the output voltage generation circuit;
   a control circuit that receives the output voltage detection signal and controls switching of the semiconductor switch so as to stabilize the output voltage;
   a power supply circuit for the control circuit that generates a supply voltage for the control circuit and that includes a rectifying diode, an inductor, and a capacitor, an anode of the rectifying diode being connected to the auxiliary coil, one terminal of the inductor being connected to a cathode of the rectifying diode, and another terminal of the inductor being connected to the capacitor; and
   a bypass switch connected in parallel to the inductor of the power supply circuit for the control circuit,
   wherein the control circuit includes a load state determination unit determining a load state according to the output voltage detection signal, the load state determination unit outputting a control signal that turns the bypass switch OFF when the load state determination unit detects a heavy load and turns the bypass switch ON when the load state determination unit detects a light load.

2. The switching power supply according to claim 1, wherein the control unit is configured such that when the output voltage detection signal is lower than a prescribed threshold, a variable switching frequency for controlling switching of the semiconductor switch is set to a prescribed minimum frequency, and the load state determination unit outputs the control signal that turns the bypass switch ON when said variable switching frequency is set to the prescribed minimum frequency.

3. The switching power supply according to claim 2, wherein the bypass switch includes a second semiconductor switch connected in parallel to the inductor and a third semiconductor switch that receives the control signal from the load state determination unit and turns the second semiconductor switch ON and OFF accordingly.

4. The switching power supply according to claim 3, wherein the second semiconductor switch is a PMOS transistor in which a source is connected to a node between the rectifying diode and the inductor, a drain is connected to a node between the inductor and the capacitor, and a gate is connected via a resistor to the source, and
wherein the third semiconductor switch is an NPN bipolar transistor in which a collector is connected to a gate, an emitter is connected to a ground, and a base is connected such that the base receives the control signal from the load state determination unit.

5. The switching power supply according to claim 3, wherein the bypass switch is integrated into the control circuit.

6. The switching power supply according to claim 1, wherein the bypass switch includes a second semiconductor switch connected in parallel to the inductor and a third semiconductor switch that receives the control signal from the load state determination unit and turns the second semiconductor switch ON and OFF accordingly.

7. The switching power supply according to claim 6, wherein the second semiconductor switch is a PMOS transistor in which a source is connected to a node between the rectifying diode and the inductor, a drain is connected to a node between the inductor and the capacitor, and a gate is connected via a resistor to the source, and
wherein the third semiconductor switch is an NPN bipolar transistor in which a collector is connected to a gate, an emitter is connected to a ground, and a base is connected such that the base receives the control signal from the load state determination unit.

8. The switching power supply according to claim 6, wherein the bypass switch is integrated into the control circuit.

* * * * *